United States Patent
Miyashita

(10) Patent No.: US 7,841,239 B2
(45) Date of Patent: Nov. 30, 2010

(54) ELECTROSTATIC CAPACITANCE DIAPHRAGM VACUUM GAUGE AND VACUUM PROCESSING APPARATUS

(75) Inventor: Haruzo Miyashita, Fujiyoshida (JP)

(73) Assignee: Canon Anelva Technix Corporation, Kawasaki-shi (JP)

( * ) Notice: Subject to any disclaimer, the term of this patent is extended or adjusted under 35 U.S.C. 154(b) by 80 days.

(21) Appl. No.: 12/404,720

(22) Filed: Mar. 16, 2009

(65) Prior Publication Data
US 2009/0235752 A1    Sep. 24, 2009

(30) Foreign Application Priority Data
Mar. 18, 2008    (JP)    ............... 2008-069379
Mar. 10, 2009    (JP)    ............... 2009-057090

(51) Int. Cl.
*G01L 9/12* (2006.01)
(52) U.S. Cl. .................... 73/718; 73/724
(58) Field of Classification Search ............. None
See application file for complete search history.

(56) References Cited

U.S. PATENT DOCUMENTS

| | | | |
|---|---|---|---|
| 5,917,264 A * | 6/1999 | Maruno et al. | 310/309 |
| 6,422,088 B1 * | 7/2002 | Oba et al. | 73/754 |
| 6,598,483 B2 | 7/2003 | Miyashita et al. | 73/718 |
| 6,877,383 B2 * | 4/2005 | Horie et al. | 73/754 |
| 6,945,115 B1 * | 9/2005 | Wang | 73/718 |
| 2002/0011114 A1 | 1/2002 | Miyashita et al. | |
| 2003/0019299 A1 * | 1/2003 | Horie et al. | 73/718 |
| 2009/0301211 A1 * | 12/2009 | Yoshikawa et al. | 73/724 |

FOREIGN PATENT DOCUMENTS

| | | |
|---|---|---|
| CN | 1340007 A | 3/2002 |
| CN | 1350636 A | 5/2002 |
| JP | 2001-255225 | 9/2001 |
| WO | 00/47429 A1 | 8/2000 |
| WO | 00/70321 A1 | 11/2000 |

OTHER PUBLICATIONS

Chinese Office Action dated Mar. 1, 2010, in related corresponding Chinese Patent Appln. No. 200910126814.9 (with English translation).

* cited by examiner

*Primary Examiner*—Andre J Allen
(74) *Attorney, Agent, or Firm*—Fitzpatrick, Cella, Harper & Scinto

(57) ABSTRACT

In an electrostatic capacitance diaphragm vacuum gauge, a diaphragm and a detection electrode opposing the diaphragm are arranged in a vacuum. The electrostatic capacitance diaphragm vacuum gauge measures pressure by measuring the change degree of an electrostatic capacitance between the diaphragm and detection electrode. The electrostatic capacitance diaphragm vacuum gauge includes atmospheric pressure variation factor detection units which detect atmospheric pressure variation factors as external factors that varies the pressure of the vacuum. The pressure of the vacuum is measured by subtracting information detected by the atmospheric pressure variation factor detection units.

3 Claims, 4 Drawing Sheets

ELECTROSTATIC CAPACITANCE DIAPHRAGM VACUUM GAUGE AND VACUUM PROCESSING APPARATUS

BACKGROUND OF THE INVENTION

1. Field of the Invention

The present invention relates to an electrostatic capacitance diaphragm vacuum gauge and a vacuum processing apparatus.

2. Description of the Related Art

An electrostatic capacitance diaphragm vacuum gauge can measure pressures highly accurately and be mass-produced using a micromachine (MEMS) technique, and accordingly it is widely used as a pressure sensor for a vacuum processing apparatus or the like.

The electrostatic capacitance diaphragm vacuum gauge is an apparatus in which a diaphragm and a detection electrode opposing the diaphragm are arranged in a vacuum. This apparatus measures the pressure by measuring the degree of change in the electrostatic capacitance between the diaphragm and the detection electrode.

FIG. 3 is a schematic sectional view showing an electrostatic capacitance diaphragm vacuum gauge disclosed in Japanese Patent Laid-Open No. 2001-255225 as a prior art.

As shown in FIG. 3, in this electrostatic capacitance diaphragm vacuum gauge, a conductive wiring line 4 is formed in an insulating substrate 1 made of glass or the like to extend through it.

The insulating substrate 1 and a conductive substrate 2 bonded to each other in a vacuum atmosphere form a reference pressure space 5 inside them. The reference pressure space 5 forms a vacuum-sealed closed space.

For example, a non evaporable getter 6 which absorbs residual gas is placed in the reference pressure space 5. The interior of the reference pressure space 5 is maintained in a high vacuum.

When a gas pressure acts on a diaphragm 3 through a region 10 communicating with the interior of a vacuum processing apparatus 9, the diaphragm 3 deflects toward a detection electrode 7 in accordance with the difference between the gas pressure and the pressure in the reference pressure space 5.

This increases the electrostatic capacitance between the detection electrode 7 and diaphragm 3. Information on the degree of increase in the electrostatic capacitance is sent to an electrical circuit 12 through the conductive wiring line 4 and an electrode pad 11. The electrical circuit 12 performs signal processing to convert the input information on the degree of change in the electrostatic capacitance into a voltage and amplify it. A signal processed by the electrical circuit 12 is obtained from an electrical output terminal 13 as the internal pressure of the vacuum processing apparatus 9.

A change in environmental temperature or the like mechanically distorts a pressure sensor. Then, the electrostatic capacitance changes and causes a measurement error. A reference electrode 8 is used to compensate this measurement error.

In the conventional electrostatic capacitance diaphragm vacuum gauge, distortion caused by a difference in coefficient of thermal expansion between the insulating substrate 1 and the conductive substrate 2 on which the insulating substrate 1 is bonded is inevitable because of its manufacturing method. The reference pressure space 5 formed by bonding the insulating substrate 1 and conductive substrate 2 is also distorted by the reception of the atmospheric pressure. To solve problems and improve the accuracy of pressure measurement, elimination of an error in pressure measurement caused by these distortions is sought.

The distortion caused by the difference in coefficient of thermal expansion between the insulating substrate 1 and conductive substrate 2 depending on the environmental temperature and the distortion caused by the atmospheric pressure are measurement error factors.

As described above, the existence of the reference electrode 8 compensates the measurement error resulting from the ambient temperature variation among the measurement error factors. To measure pressures more accurately, however, the measurement errors factors caused by the atmospheric pressure's change must be also compensated.

SUMMARY OF THE INVENTION

It is therefore an object of the present invention to further decrease, in an electrostatic capacitance diaphragm vacuum gauge, the measurement error factors caused by the atmospheric pressure's change, so that the pressure can be measured more accurately.

According to one aspect of the present invention, there is provided an electrostatic capacitance diaphragm vacuum gauge which includes a diaphragm arranged to face an internal region of which a pressure is to be measured, and a detection electrode arranged to oppose the diaphragm, and which measures the pressure of the internal region by measuring a degree of a change in an electrostatic capacitance between the diaphragm and the detection electrode, the gauge comprising:

a temperature measurement unit to measure a temperature of an external environment where the electrostatic capacitance diaphragm vacuum gauge is installed;

an atmospheric pressure measurement unit which measures an atmospheric pressure of the external environment where the electrostatic capacitance diaphragm vacuum gauge is installed;

an arithmetic unit which calculates an electrostatic capacitance corresponding to the external environment where the electrostatic capacitance diaphragm vacuum gauge is installed from information on at least one of a plurality of electrostatic capacitances measured in advance and stored in a memory unit on the basis of the environmental temperature and the environmental atmospheric pressure;

an electrostatic capacitance compensation unit which compares the measured electrostatic capacitance and the calculated electrostatic capacitance and compensates the measured electrostatic capacitance on the basis of the comparison result; and an output characteristics compensation unit which compensates the characteristics on the basis of output characteristics on the environmental atmospheric pressure which is measured in advance and stored in the memory unit, wherein the electrostatic capacitance compensation unit calculates a voltage based on the compensated electrostatic capacitance, and the output characteristics compensation unit outputs the voltage calculated by the electrostatic capacitance compensation unit on the basis of the compensated output characteristics.

According to another aspect of the present invention, there is provided a vacuum processing apparatus which includes a vacuum vessel comprising an electrostatic capacitance vacuum gauge according to one aspect of the present invention.

The present invention decreases an output variation caused by a variation in the measurement environment where the electrostatic capacitance diaphragm vacuum gauge is installed, that is, a variation in atmospheric pressure and temperature, so that the pressure can be measured more accurately with good reproducibility.

Further features of the present invention will become apparent from the following description of an exemplary embodiment with reference to the attached drawings.

DESCRIPTION OF THE EMBODIMENT

The best embodiment to practice the present invention will be described hereinafter with reference to the accompanying drawings.

(Electrostatic Capacitance Diaphragm Vacuum Gauge)

Figure 1A:
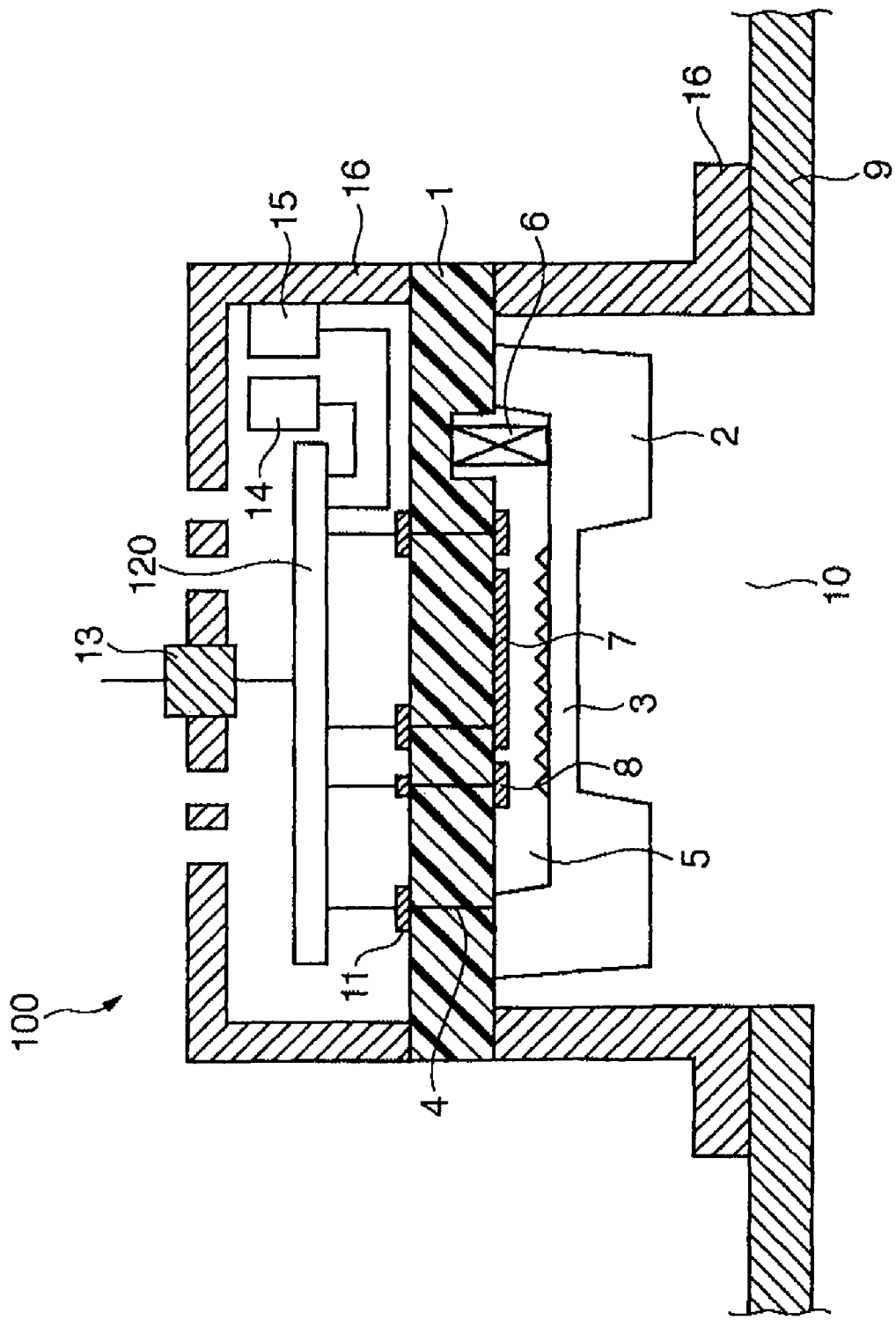
FIG. 1A is a schematic sectional view showing an electrostatic capacitance diaphragm vacuum gauge according to an embodiment of the present invention.
Figure 1B:
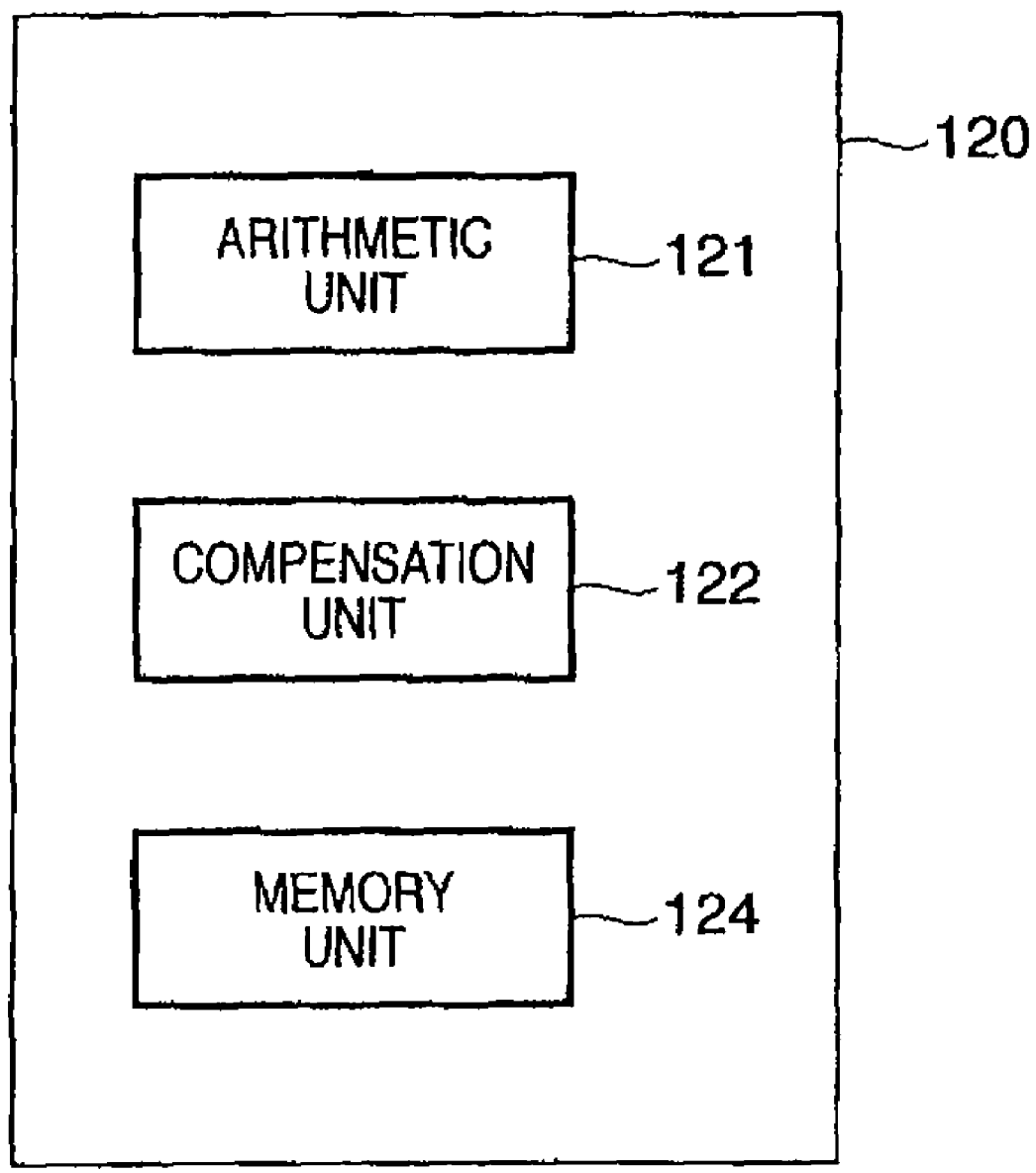
FIG. 1B is a view showing the circuit configuration of an electrical circuit 120.

FIG. 1A is a schematic sectional view showing an electrostatic capacitance diaphragm vacuum gauge according to an embodiment of the present invention. FIG. 1B is a view showing the circuit configuration of an electrical circuit 120 of the electrostatic capacitance diaphragm vacuum gauge according to the embodiment of the present invention.

As shown in FIG. 1A, an electrostatic capacitance diaphragm vacuum gauge 100 of this embodiment includes an insulating substrate 1, conductive substrate 2, diaphragm 3, conductive wiring line 4, reference pressure space 5, getter 6, detection electrode 7, and reference electrode 8. The conductive substrate 2 and diaphragm 3 are arranged to face an internal region 10 communicating with the vacuum chamber of a vacuum processing apparatus 9.

The electrostatic capacitance diaphragm vacuum gauge 100 also includes an electrode pad 11, the electrical circuit 120, an electrical output terminal 13, an atmospheric pressure measurement unit 14, a temperature measurement unit 15, and a case 16. The atmospheric pressure measurement unit 14 includes, for example, a pressure sensor, and measures the atmospheric pressure (environmental atmospheric pressure) of the surrounding environment where the vacuum processing apparatus 9 is installed. Data measured by the atmospheric pressure measurement unit 14 is referred to as environmental atmospheric pressure data. The temperature measurement unit 15 includes, for example, a temperature sensor, and measures the temperature (environmental temperature) of the surrounding environment where the vacuum processing apparatus 9 is installed. Data measured by the temperature measurement unit 15 is referred to as environmental temperature data. In the example of FIG. 1A, the temperature measurement unit 15 is placed in contact with the case 16. However, the position of the temperature measurement unit 15 is not limited to this example, but the temperature measurement unit 15 can be placed at any position where it can measure the temperature (environmental temperature) of the surrounding environment of the vacuum processing apparatus 9. The detection results of the atmospheric pressure measurement unit 14 and temperature measurement unit 15 are sent to the electrical circuit 120.

The measurement value of the pressure of the internal region 10 which is detected through the diaphragm 3 varies by the influence of at least one of the environmental atmospheric pressure and the environmental temperature. The atmospheric pressure measurement unit 14 and temperature measurement unit 15 serve as a pressure measurement error factor detection means to detect capacitance change factor which has no concern with the pressure in the internal region 10.

The electrical circuit 120 includes an arithmetic unit 121, compensation unit 122, and memory unit 124. The arithmetic unit 121 can arithmetically process the measurement result and interpolate data measured in advance. The compensation unit 122 can compensate the measurement value of the pressure of the internal region 10 with the environmental atmospheric pressure on the basis of the measurement result of the atmospheric pressure measurement unit 14. The compensation unit 122 can also compensate the measurement value of the pressure of the internal region 10 with the environmental temperature on the basis of the measurement result of the temperature measurement unit 15.

In this embodiment, the compensation unit 122 performs the compensations so that the compensation on the basis of the measurement result of the temperature measurement unit 15 is previously performed to the compensation on the basis of the measurement result of the atmospheric pressure measurement unit 14. An order of the compensation process performed by the compensation unit 122 is not limited the above-mentioned order of the compensation process. For example, the compensation unit 122 can also perform in parallel the compensation on the basis of the measurement result of the temperature measurement unit 15 and the compensation on the basis of the measurement result of the atmospheric pressure measurement unit 14. The compensation unit 122 can also perform compensations so that the compensation on the basis of the measurement result of the atmospheric pressure measurement unit 14 is previously performed to the compensation on the basis of the measurement result of the temperature measurement unit 15. The memory unit 124 stores the measurement data of the electrostatic capacitance between the diaphragm 3 and detection electrode 7 corresponding to the environmental temperature and environmental atmospheric pressure, which are set in advance, as the measurement conditions.

For example, when T1 is measured as an environmental temperature, the memory unit 124 stores in advance the measurement data of electrostatic capacitances C11 to Cn1 corresponding to pressures P11 to Pn1 which are measured under the measured temperature T1, as follows:

Pressure: P11 P21 P31 . . . Pn1

Electrostatic Capacitance: C1 C21 C31 . . . Cn1

Similarly, when the measurement temperature is T2, the memory unit 124 stores in advance the measurement data of electrostatic capacitances C12 to Cn2 corresponding to pressures P12 to Pn2.

The memory unit 124 can store a plurality of patterns of data including the electrostatic capacitances and the pressures in the environmental temperature which are obtained by sampling at temperatures of T1 and T2, for example, 0° C. to 50° C. at intervals of 5° C.

The memory unit 124 also stores, as data corresponding to the environmental temperature and environmental atmospheric pressure, data obtained by converting the pressure measured in advance into output voltage.

That is, the diaphragm 3 deflects in accordance with the pressure of the internal region 10 communicating with the interior of the vacuum processing apparatus 9. When the diaphragm 3 comes close to the detection electrode 7 and reference electrode 8, the electrostatic capacitance between the detection electrode 7 and diaphragm 3 and that between the reference electrode 8 and diaphragm 3 increase. The change degree of the electrostatic capacitances are input to the electrical circuit 120 via the conductive wiring line 4 and electrode pad 11. The detection result of the detection electrode 7 and that of the reference electrode 8 are input to the electrical circuit 120 simultaneously.

The electrostatic capacitance (detection electrostatic capacitance) input via the conductive wiring line 4 and electrode pad 11 indicates the change degree of the electrostatic capacitance before correction on the basis of information (the measurement results) from the temperature measurement unit 15 and the atmospheric pressure measurement unit 14.

When the measurement results of the atmospheric pressure measurement unit 14 and temperature measurement unit 15 are input to the electrical circuit 120, the arithmetic unit 121 calculates the pressure from measurement data (electrostatic capacitance) for the given condition by referring to the environmental temperature data stored in advance in the memory unit 124.

If the memory unit 124 does not store measurement data for the given environmental temperature condition, the arithmetic unit 121 performs interpolation utilizing environmental temperature data stored in the memory unit 124 and obtains the environmental temperature data on the basis of the interpolation. Furthermore, the arithmetic unit 121 obtains the pressure (environmental atmospheric pressure data) corresponding to the environmental atmospheric pressure condition. If the memory unit 124 does not store measurement data for the given environmental atmospheric pressure condition, the arithmetic unit 121 performs interpolation utilizing environmental atmospheric pressure data stored in the memory unit 124 and obtains the environmental atmospheric pressure data on the basis of the interpolation.

Figure 2:
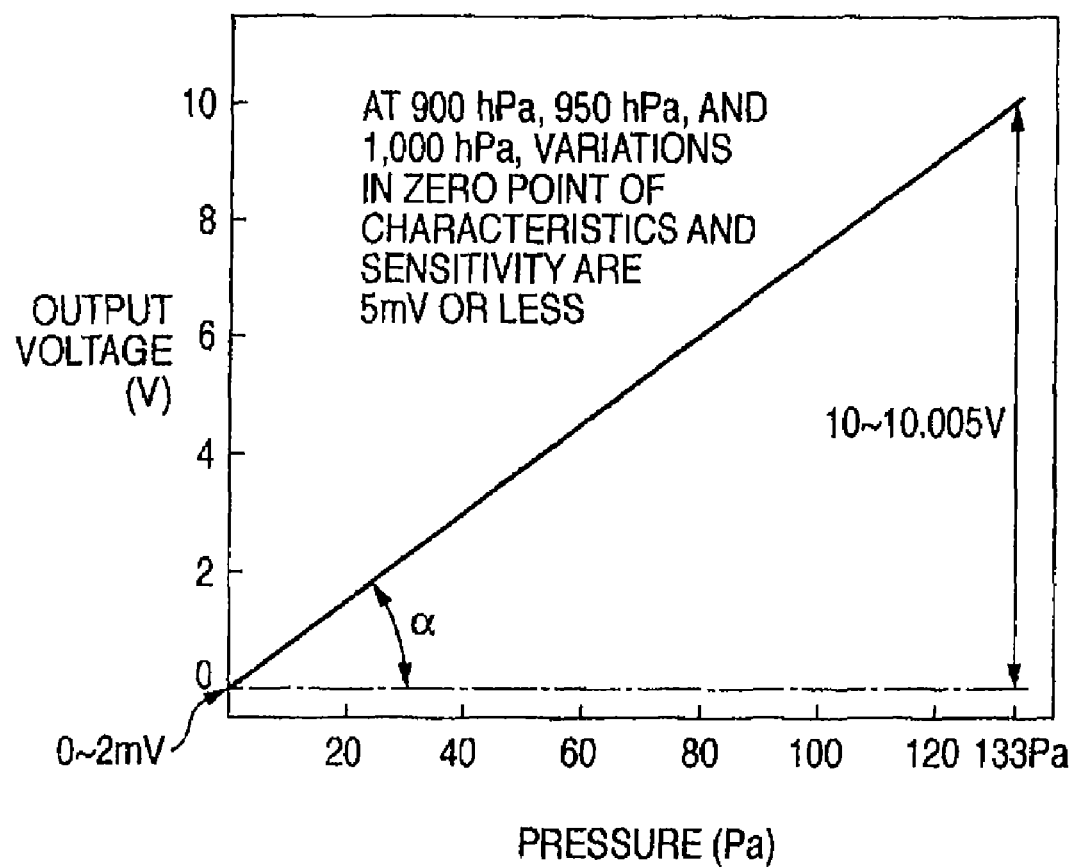
FIG. 2 is a graph showing the atmospheric pressure dependency of the output voltage vs. pressure characteristics of the electrostatic capacitance diaphragm vacuum gauge according to the embodiment of the present invention.
Figure 3:
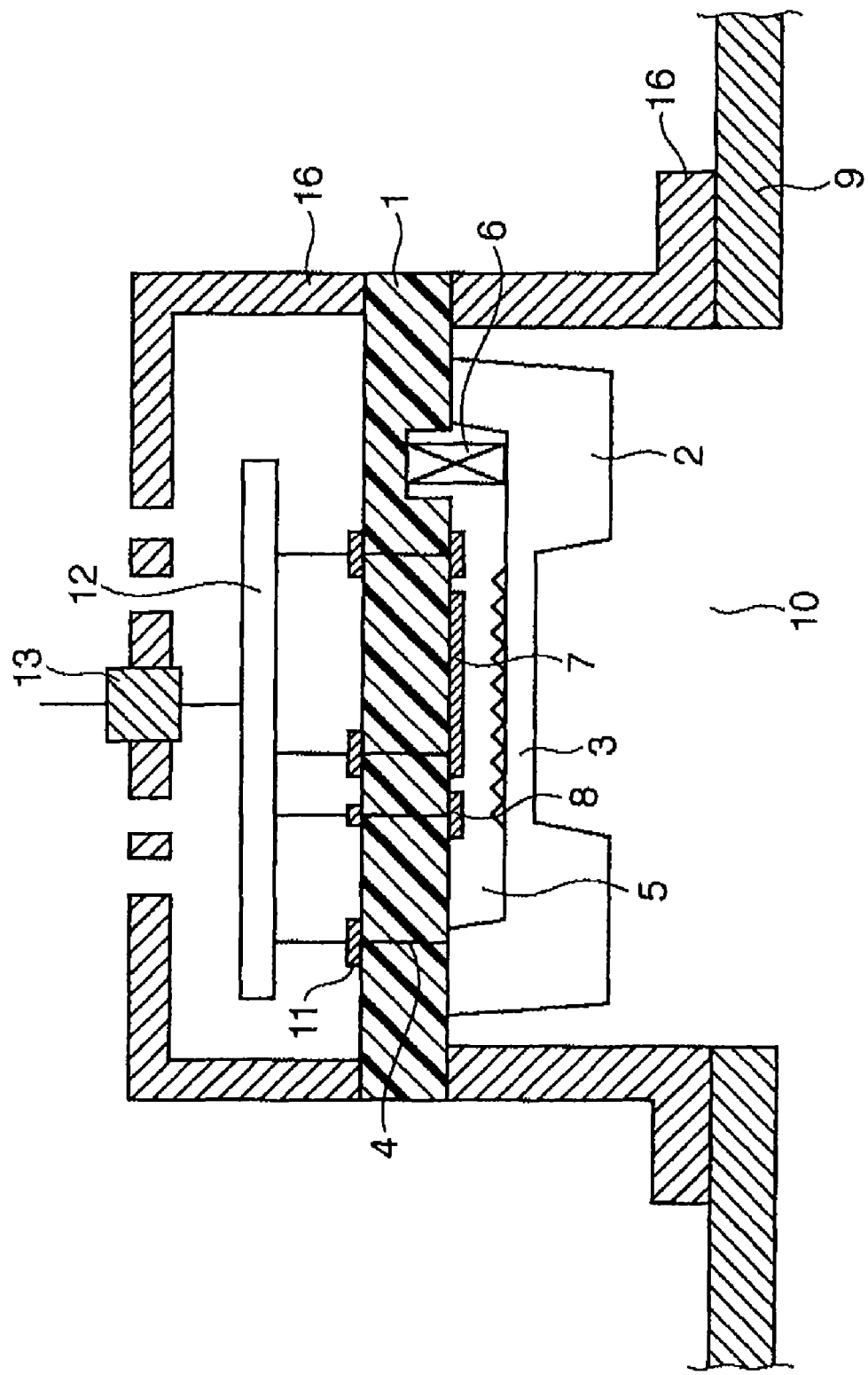
FIG. 3 is a schematic sectional view showing an electrostatic capacitance diaphragm vacuum gauge disclosed in patent reference 1 as a prior art.

When the measurement results of the atmospheric pressure measurement unit 14 and temperature measurement unit 15 are input to the electrical circuit 120, the compensation unit 122 calculates the relationship of the voltage vs the pressure for matching between the output voltage and the environmental atmospheric pressure as shown in FIG. 2 on the basis of data which is stored in the memory unit 124 in advance. FIG. 2 is a graph showing the atmospheric pressure dependency of the output voltage vs pressure characteristics of the electrostatic capacitance diaphragm vacuum gauge according to the embodiment of the present invention.

Assume that the data for matching between the environmental atmospheric pressure and output voltage is measured in advance to correspond to a plurality of environmental atmospheric pressures (e.g., 900 hPa, 950 hPa, and 1,000 hPa) and stored in the memory unit 124.

On the basis of the measurement result of the atmospheric pressure measurement unit 14, the arithmetic unit 121 obtains the relationship between the pressure corresponding to the atmospheric pressure (environmental atmospheric pressure) of the external environment and the output voltage by referring to the memory unit 124. If the memory unit 124 does not store data corresponding to the measurement result of the atmospheric pressure measurement unit 14, the arithmetic unit 121 performs interpolation using the relationship between the measured pressure corresponding to a plurality of environmental atmospheric pressures and the output voltage, and calculates the zero point where the output voltage becomes zero with respect to the atmospheric pressure and the sensitivity ($\alpha$ in FIG. 2) of the pressure corresponding to the output voltage. The zero point corresponding to the atmospheric pressure of the external environment and the sensitivity of the pressure is calculated and compensated by the interpolation process (FIG. 2). Information that indicates the compensated pressure is output from the electrical output terminal 13.

Concretely, the relationship between the output voltage of the electrostatic capacitance diaphragm vacuum gauge according to the present invention and the pressure is clarified by changing the atmospheric pressure among, for example, 900 hPa, 950 hPa, and 1,000 hPa at an environmental temperature of, for example, 25° C. as a constant condition. The voltage change degree depending on differences in environmental atmospheric pressure are actually measured in advance. The obtained voltage variation degree are stored in advance in the memory unit 124 on the electrical circuit 120.

As a result, even when the pressure changes among 900 hPa, 950 hPa, and 1,000 hPa, a ratio of the atmospheric pressures to the measurement values in the electrostatic capacitance diaphragm vacuum gauge is as small as 0.05% or less. Thus, highly accurate pressure measurement is enabled.

The coefficient of thermal expansion differs between the conductive substrate 2 on which the insulating substrate 1 is bonded and the case 16 that supports the insulating substrate 1 and conductive substrate 2. Accordingly, when the environmental temperature changes, the insulating substrate 1 distorts.

The atmospheric pressure measurement unit 14 such as a pressure sensor and the temperature measurement unit 15 such as a temperature sensor are placed near the case 16. On the basis of the information concerning the environmental atmospheric pressure and environmental temperature obtained by the atmospheric pressure measurement unit 14 and temperature measurement unit 15, respectively, the electrostatic capacitance between the diaphragm 3 and detection electrode 7 and the relationship between the output voltage and environmental atmospheric pressure can be compensated.

(Vacuum Processing Apparatus)

The vacuum vessel of the vacuum processing apparatus 9 according to the embodiment of the present invention is provided with the electrostatic capacitance diaphragm vacuum gauge 100 (FIG. 1A). The electrostatic capacitance diaphragm vacuum gauge 100 detects the pressure in the vacuum vessel (the internal region 10 communicating with the interior of the vacuum processing apparatus 9). The electrostatic capacitance diaphragm vacuum gauge 100 forms part of the vacuum processing apparatus 9. The electrostatic capacitance diaphragm vacuum gauge 100 detects the pressure indicating the vacuum degree of the internal region 10 highly accurately. On the basis of this detection result, for example, the vacuum processing apparatus 9 generates plasma in the vacuum chamber communicating with the internal region 10, and performs a process such as CVD or PVD for a target object disposed in the vacuum chamber.

The process can be performed while the pressure indicating the vacuum degree of the internal region 10 is detected highly accurately.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-069379 filed Mar. 18, 2008, Japanese Patent Application No. 2009-057090 filed Mar. 10, 2009, which are hereby incorporated by reference herein in their entirety.

What is claimed is:

1. An electrostatic capacitance diaphragm vacuum gauge which includes a diaphragm arranged to face an internal region of which a pressure is to be measured, and a detection electrode arranged to oppose said diaphragm, and which measures the pressure of the internal region by measuring a degree of change in an electrostatic capacitance between said diaphragm and said detection electrode, the gauge comprising:

a temperature measurement unit to measure a temperature of an external environment where the electrostatic capacitance diaphragm vacuum gauge is installed;

an atmospheric pressure measurement unit which measures an atmospheric pressure of the external environment where the electrostatic capacitance diaphragm vacuum gauge is installed;

an arithmetic unit which calculates an electrostatic capacitance corresponding to the external environment where the electrostatic capacitance diaphragm vacuum gauge is installed from information on at least one of a plurality of electrostatic capacitances measured in advance and stored in a memory unit on the basis of the environmental temperature and the environmental atmospheric pressure;

an electrostatic capacitance compensation unit which compares the measured electrostatic capacitance and the calculated electrostatic capacitance and compensates the measured electrostatic capacitance on the basis of the comparison result; and an output characteristics compensation unit which compensates the characteristics on the basis of output characteristics on the environmental atmospheric pressure which is measured in advance and stored in the memory unit, wherein said electrostatic capacitance compensation unit calculates a voltage based on the compensated electrostatic capacitance, and said output characteristics compensation unit outputs the voltage calculated by said electrostatic capacitance compensation unit on the basis of the compensated output characteristics.

2. The electrostatic capacitance diaphragm vacuum gauge according to claim 1, wherein said atmospheric pressure measurement unit includes a pressure sensor, and said temperature measurement unit includes a temperature sensor.

3. A vacuum processing apparatus which includes a vacuum vessel comprising an electrostatic capacitance vacuum gauge according to claim 1.

* * * * *

UNITED STATES PATENT AND TRADEMARK OFFICE
CERTIFICATE OF CORRECTION

PATENT NO. : 7,841,239 B2
APPLICATION NO. : 12/404720
DATED : November 30, 2010
INVENTOR(S) : Haruzo Miyashita Page 1 of 1

It is certified that error appears in the above-identified patent and that said Letters Patent is hereby corrected as shown below:

ON THE COVER PAGE:

At Item (73), Assignee:
Canon Anelva Technix Corporation, Kawasaki-shi (JP) should read
--Canon Anelva Corporation, Kawasaki-shi (JP)--.

Signed and Sealed this
Seventeenth Day of April, 2012

David J. Kappos
*Director of the United States Patent and Trademark Office*